US011981524B2

(12) United States Patent
Jang et al.

(10) Patent No.: US 11,981,524 B2
(45) Date of Patent: May 14, 2024

(54) MEDIUM CONVEYANCE ROUTE SWITCHING DEVICE FOR AUTOMATED TELLER MACHINE

(71) Applicant: HYOSUNG TNS INC., Seoul (KR)

(72) Inventors: Hyun Soo Jang, Seoul (KR); Hye Bin Oh, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 242 days.

(21) Appl. No.: 17/548,861

(22) Filed: Dec. 13, 2021

(65) Prior Publication Data

US 2022/0204301 A1 Jun. 30, 2022

(30) Foreign Application Priority Data

Dec. 31, 2020 (KR) ........................ 10-2020-0189022

(51) Int. Cl.
*B65H 29/60* (2006.01)
*B65H 5/36* (2006.01)
(Continued)

(52) U.S. Cl.
CPC ............... *B65H 29/60* (2013.01); *B65H 5/36* (2013.01); *B65H 29/58* (2013.01); *G07F 19/20* (2013.01);
(Continued)

(58) Field of Classification Search
CPC .. B65H 2301/44822; B65H 2301/3124; B65H 2301/3125; B65H 29/58;
(Continued)

(56) References Cited

U.S. PATENT DOCUMENTS 8,695,977 B2 * 4/2014 Nunn ..................... B65H 29/58 271/303
10,167,161 B2 * 1/2019 Chang .................... B65H 29/58
(Continued)

FOREIGN PATENT DOCUMENTS

KR 20180051722 A 5/2018
KR 10-2021-0081150 A 7/2021

OTHER PUBLICATIONS

Office Action in Indian Application No. 202114060555 dated Aug. 30, 2022.
(Continued)

*Primary Examiner* — Luis A Gonzalez
(74) *Attorney, Agent, or Firm* — BACON&THOMAS,PLLC

(57) ABSTRACT

A medium conveyance route switching device includes: a support unit located at a branching point where conveyance directions of a medium converge in three directions; a gate assembly including a plurality of gates to guide at the branching point the medium to different conveyance paths; and a rotation mechanism configured to selectively rotate the plurality of gates. The support unit includes: a first support piece having a first through-hole portion; a second support piece having a second through-hole portion; a third support piece having a third through-hole portion; a first bending connection portion rotatably connecting one end of the first support piece and the second support piece; a second bending connection portion rotatably connecting the other end of the first support piece and the third support piece; and a fixing shaft inserted into the first through-hole portion, the second through-hole portion, and the third through-hole portion.

5 Claims, 8 Drawing Sheets

(51) Int. Cl.
*B65H 29/58* (2006.01)
*G07F 19/00* (2006.01)

(52) U.S. Cl.
CPC .............. *B65H 2301/44822* (2013.01); *B65H 2404/7414* (2013.01); *B65H 2404/7431* (2013.01)

(58) Field of Classification Search
CPC .... B65H 29/60; B65H 2404/632; B65H 5/36; B65H 2404/7414; B65H 2404/7431; G07F 19/20
See application file for complete search history.

(56) References Cited

U.S. PATENT DOCUMENTS

| | | | | |
|---|---|---|---|---|
| 10,377,599 | B2 * | 8/2019 | Chou ..................... | B65H 43/04 |
| 11,640,740 | B2 * | 5/2023 | Jang ....................... | B65H 43/02<br>271/303 |
| 2018/0040189 | A1 | 2/2018 | Chang et al. | |
| 2020/0361737 | A1 | 11/2020 | Wakabayashi et al. | |

OTHER PUBLICATIONS

Extended European Search Report corresponding to European Appln. E 21212503.3 dated May 25, 2022.

* cited by examiner

MEDIUM CONVEYANCE ROUTE SWITCHING DEVICE FOR AUTOMATED TELLER MACHINE

TECHNICAL FIELD

The present disclosure relates to a medium conveyance route switching device for an automated teller machine.

BACKGROUND

In general, an automated teller machine is an apparatus that allows a user to perform a deposit/withdrawal transaction of a cash or a check, an account transfer and an inquiry service without time restrictions through the use of a cash card or a bankbook issued by a financial institution. The automated teller machine is an unmanned terminal which is widely used in the financial industry because it can rapidly provide financial services to a user.

Such an automated teller machine includes a deposit/withdrawal part for a user to input or receive a medium for deposit or withdrawal, a conveyance path through which the medium deposited or withdrawn through the deposit/withdrawal part is conveyed, a discrimination part provided on the conveyance path to discriminate the presence or absence of an abnormality of a medium and the type of the medium, a temporary storage part in which the deposited medium that has passed through the discrimination part is temporarily stored, a rejected medium storage part configured to accommodate a medium discriminated by the discrimination part to have an abnormality, and a medium storage part configured to perform a recycle function so that the medium is received or withdrawn.

In addition, a gate provided in the conveyance path has usually a blade shape and is installed at a position where the conveyance path is branched to be rotatable about a rotation shaft. The gate is configured such that a medium conveyed from any one conveyance path is conveyed to one of the remaining conveyance paths in correspondence to a deposit/withdrawal step. A medium conveyance route switching device is provided in the conveyance path so as to switch a medium conveyance route to a plurality of other conveyance routes in each deposit/withdrawal step.

A conventional medium conveyance route switching device has a triangular-shaped blade rotatably installed at a position where three conveyance paths are branched. The conventional medium conveyance route switching device is configured such that a medium conveyed from any one conveyance path is conveyed to one of the remaining two conveyance paths in correspondence to a deposit/withdrawal step.

However, in the conventional medium conveyance route switching device, the installation space of an actuator for driving the blade occupies a relatively large space. This may make it difficult to arrange components inside the device in a space saving manner.

In addition, the conventional medium conveyance route switching device is limited to the conveyance paths branched in three directions and, therefore, may not be able to actively cope with an increasing trend in the branching direction of the conveyance path due to diversified cassette arrangement.

PRIOR ART DOCUMENT

Korean Patent Registration No. 10-1173806

SUMMARY

Embodiments of the present disclosure provide a medium conveyance route switching device for an automated teller machine, which are capable of accurately and rapidly changing a conveyance direction of a medium at the time of depositing or withdrawing the medium.

Furthermore, embodiments of the present disclosure provide a medium conveyance route switching device for an automated teller machine, which are capable of reducing an installation space of an actuator for driving a gate and consequently realizing space-intensive arrangement of components in the device.

In addition, embodiments of the present disclosure provide a medium conveyance route switching device for an automated teller machine, which are capable of increasing the branching directions of a conveyance path in conformity with the diversified medium cassette arrangement.

In accordance with an aspect of the present disclosure, there is provided a medium conveyance route switching device for an automated teller machine, including: a support unit located at a branching point where conveyance directions of a medium converge in three directions; a gate assembly including a plurality of gates to guide at the branching point the medium to different conveyance paths; and a rotation mechanism configured to selectively rotate the plurality of gates, wherein the support unit includes: a first support piece having a first through-hole portion; a second support piece having a second through-hole portion and disposed on one side of the first support piece; a third support piece having a third through-hole portion and disposed on the other side of the first support piece; a first bending connection portion rotatably connecting one end of the first support piece and the second support piece; a second bending connection portion rotatably connecting the other end of the first support piece and the third support piece; and a fixing shaft inserted into the first through-hole portion, the second through-hole portion and the third through-hole portion to prevent the first through-hole portion, the second through-hole portion and the third through-hole portion from being separated from each other in a state in which the first support piece, the second support piece and the third support piece are in contact with each other.

The support unit may be provided in a form of an assembly in which a plurality sets of the first support piece, the second support piece and the third support piece and a plurality sets of the first gate, the second gate and the third gate are alternately provided to be spaced apart and connected along a longitudinal direction of the fixing shaft.

The first support piece, the second support piece and the third support piece may be disposed symmetrically with the fixing shaft interposed therebetween.

The plurality of gates may include: a first gate for guiding the conveyance direction of the medium from a first conveyance path to a second conveyance path or a third conveyance path among the conveyance paths; a second gate for guiding the conveyance direction of the medium from the second conveyance path to the first conveyance path or the third conveyance path; and a third gate for guiding the conveyance direction of the medium from the third conveyance path to the first conveyance path or the second conveyance path.

At least one of the first bending connection portion and the second bending connection portion may be formed of a flexible material.

According to the embodiments of the present disclosure, since the three support piece are connected as one unit through the bending connection portions, the assemblability of the medium conveyance route switching device can be improved.

According to the embodiments of the present disclosure, it is possible to accurately and rapidly change a conveyance direction of a medium at the time of depositing or withdrawing the medium with a simple structure.

In addition, according to the embodiments of the present disclosure, it is possible to increase the branching directions of the conveyance path in conformity with the diversified medium cassette arrangement.

DETAILED DESCRIPTION

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, or 'coupled' to another element, it should be understood that the element may be directly connected to, supported by, or coupled another element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

In the present specification, expressions such as upper side, lower side and the like are described based on the drawings, but it is to be noted that when the orientation of the corresponding subject is changed, it may be expressed differently.

Hereinafter, a medium conveyance route switching device for an automated teller machine according to one embodiment of the present disclosure will be described with reference to FIGS. 1 to 4.

Figure 1:
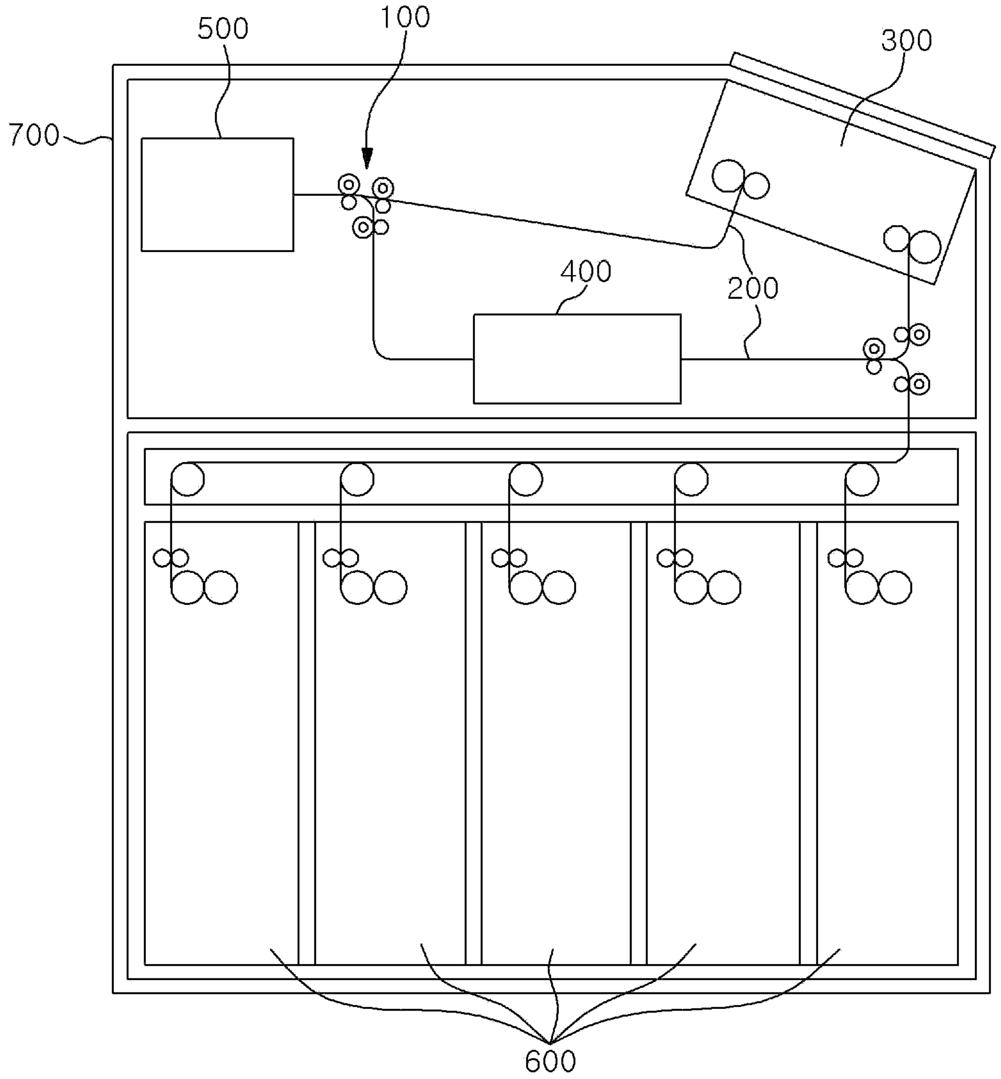
FIG. 1 is a diagram schematically showing an automated teller machine provided with a medium conveyance route switching device according to one embodiment of the present disclosure.
Figure 2:
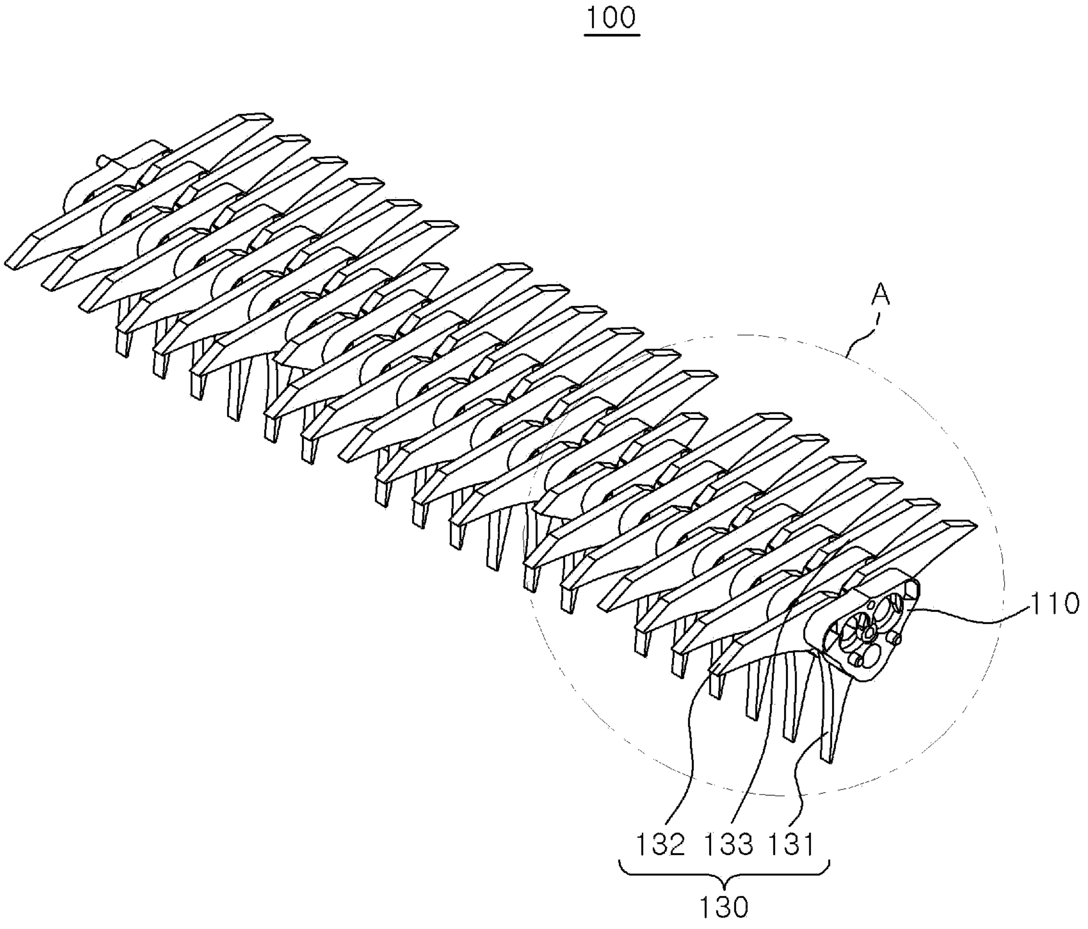
FIG. 2 is a perspective view showing the medium conveyance route switching device according to one embodiment of the present disclosure.
Figure 3:
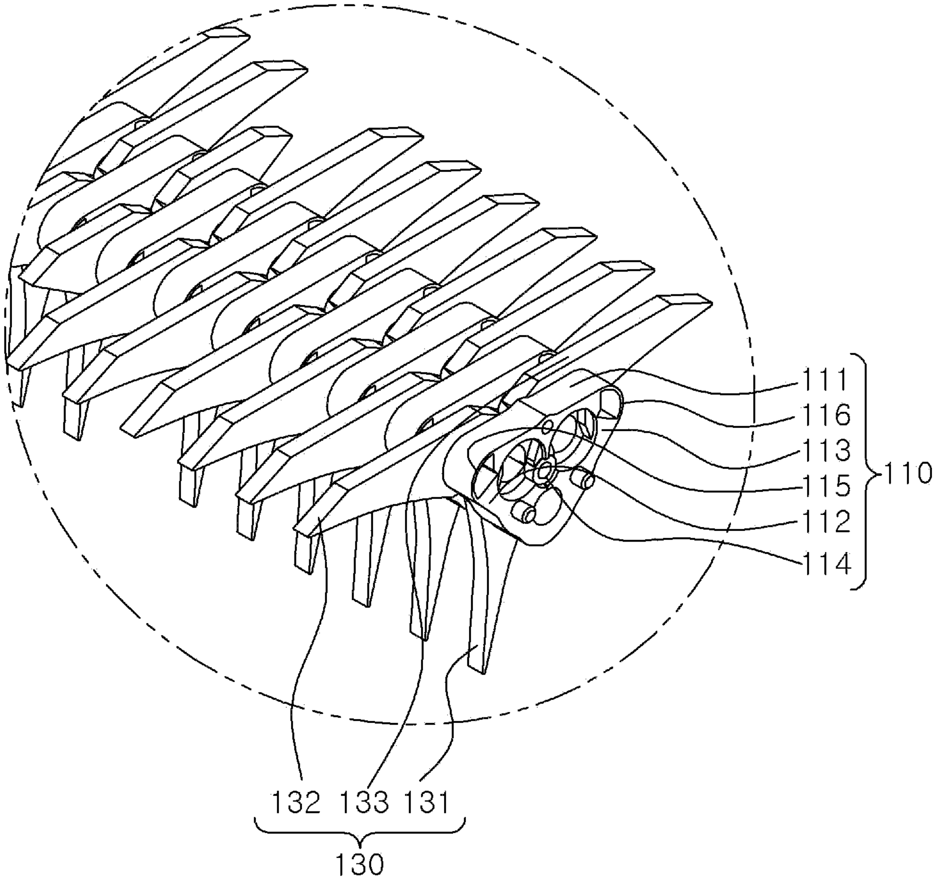
FIG. 3 is an enlarged perspective view of a portion "A" in FIG. 2.
Figure 4:
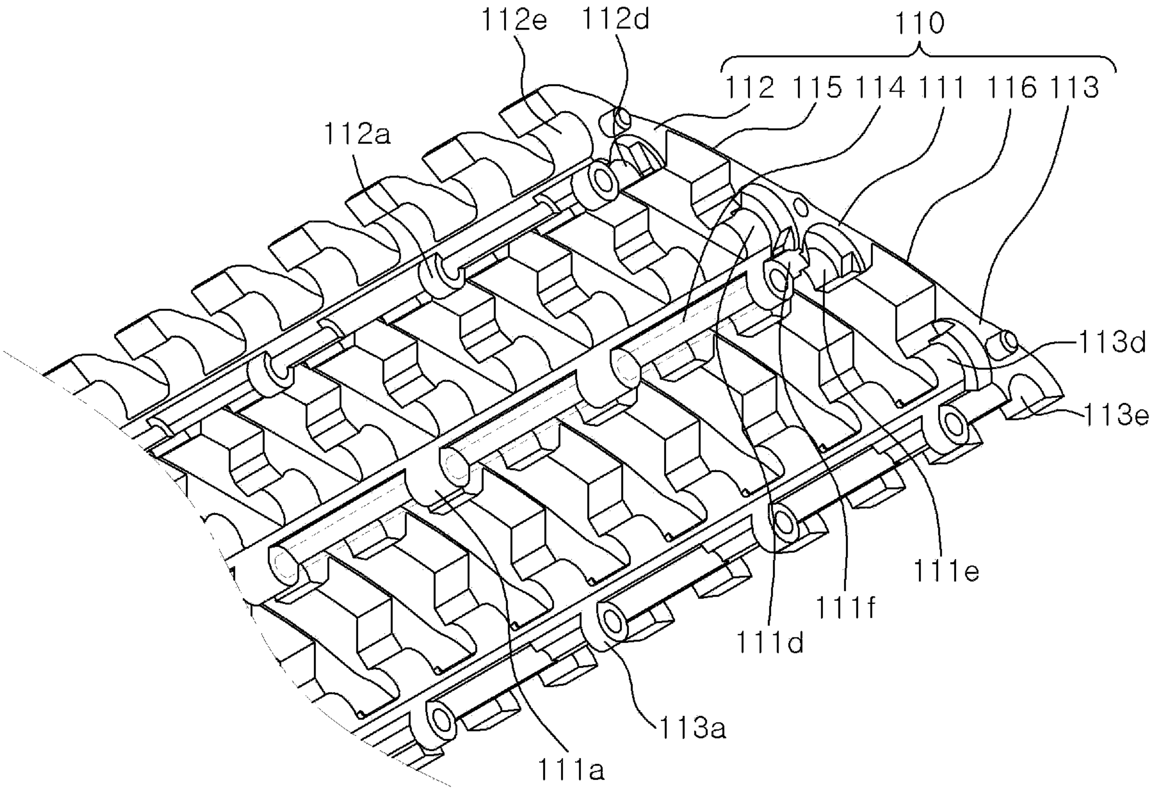
FIG. 4 is a perspective view showing a rear side of a support unit before assembly of the medium conveyance route switching device according to one embodiment of the present disclosure.

FIG. 1 is a block diagram schematically showing an automated teller machine provided with a medium conveyance route switching device according to one embodiment of the present disclosure.

As shown in FIG. 1, the automated teller machine 10 according to one embodiment of the present disclosure includes a frame/housing 700, a deposit/withdrawal part 300, a conveyance path 200, a medium conveyance route switching device 100, a discrimination part 400, a temporary holding part 500, and a recycle cassette 600.

The frame/housing 700 may provide a storage space for storing media. In the present embodiment, the frame/housing 700 is not limited to a storage space for media (a banknote, a check, etc.). The frame/housing 700 may provide the overall appearance of the automated teller machine.

The deposit/withdrawal part 300 may provide a deposit/withdrawal space for inputting or receiving media. The deposit/withdrawal part 300 may be provided with belts, rollers, motors and the like for conveying the medium. Configurations of the belts, the rollers, the motors and the like are generally known in the art of medium conveyance and, therefore, the detailed description thereof will be omitted.

The conveyance path 200 may provide a medium conveyance path in the internal space of the frame/housing 700. The conveyance path 200 may provide a conveyance route of a medium to be deposited and withdrawn through the deposit/withdrawal part 300. For example, the conveyance path 200 may guide a medium deposited through the deposit/withdrawal part 300 to the discrimination part 400, the temporary holding part 500 or the recycle cassette 600, or may guide a medium discharged from the recycle cassette 600 to the discrimination part 400 or the deposit/withdrawal part 300.

The medium conveyance route switching device 100 may be installed on the conveyance path 200. The medium conveyance route switching device 100 may branch the conveyance path so that the moving direction of a medium is guided. Details of the medium conveyance route switching device 100 will be described later.

The discrimination part 400 may be installed on the conveyance path 200. The discrimination part 400 may discriminate the type and the presence or absence of abnormality of a medium moving through the conveyance path 200. At the time of counting the deposited media, the normal medium discriminated as a medium having no abnormality by the discrimination part 400 may be temporarily stored in the temporary holding part 500. The suspected medium discriminated as a medium having an abnormality by the discrimination part 400 may be returned to the customer through the deposit/withdrawal part 300.

The temporary holding part 500 may provide a storage space for temporarily storing the medium discriminated by the discriminating part 400. The temporary holding part 500 may receive the medium discriminated by the discrimination part 400 through the conveyance path 200.

The recycle cassette 600 may provide a stacking space capable of storing a medium during deposition. The recycle cassette 600 may discharge the medium stored in the stacking space during withdrawal. The recycle cassette 600 may include a plurality of cassettes having different sizes depending on the types of media.

The configuration of the automated teller machine 10 described above is exemplified to help understanding of the present embodiment. Accordingly, other components may be added to the above-described configuration as needed. The configuration and structure may be modified or changed according to the needs.

As shown in FIGS. 2 to 8, the medium conveyance route switching device 100 according to one embodiment of the present disclosure may include a support unit 110, a gate assembly 130, and a rotation mechanism.

Specifically, the support unit 110 may be located at a branching point of the conveyance path 200 where medium conveyance routes converge in three directions. The medium moving on the conveyance path 200 may be supported by a guide roller 710. In the case of the three-way conveyance path 200, for the sake of convenience and understanding of the description, the conveyance path located on the lower side in the drawings is defined as a first conveyance path 201, the conveyance path located on the left side in the drawings is defined as a second conveyance path 202, and the conveyance path located on the right side in the drawings is defined as a third conveyance path 203. The support unit 110 may be located at a point where the conveyance path 200 is branched into switching paths 120.

The support unit 110 may include a first support piece 111, a second support piece 112, a third support piece 113, a fixing shaft 114, a first bending connection portion 115 and a second bending connection portion 116.

The first support piece 111 may be rotatably connected to the second support piece 112 and the third support piece 113. For example, one end of the first support piece 111 may be rotatably connected to the second support piece 112 through the first bending connection portion 115, and the other end of the first support piece 111 may be rotatably connected to the third support piece 113 through the second bending connection portion 116.

The first bending connection portion 115 and the second bending connection portion 116 are bent without being folded and notched to respectively rotate the second support piece 112 and the third support piece 113 with respect to the first support piece 111. The first bending connection portion 115 and the second bending connection portion 116 may be formed of a flexible material that can be bent without being folded or notched. In addition, the first support piece 111, the second support piece 112 and the third support piece 113 may be integrally formed, and the first bending connection portion 115 and the second bending connection portion 116 may also be integrally formed with the first support piece 111, the second support piece 112 and the third support piece 113.

Both sidewalls of the first support piece 111 may be in close contact with a sidewall of the second support piece 112 and a sidewall of the third support piece 113, respectively. A first through-hole portion 111*a* may be formed in a lower edge portion of the first support piece 111. When assembling the support unit 110, in a state in which the first support piece 111 is in close contact with the second support piece 112 and the third support piece 113, the fixing shaft 114 may be inserted and fixed to the first through-hole portion 111*a* of the first support piece 111.

Further, the first support piece 111 may include first shaft grooves 111*d* and 111*e* for respectively supporting at least a portion of a second rotation shaft 152 and at least a portion of a third rotation shaft 153, and a first fixing shaft groove 111*f* for supporting at least a portion of the fixing shaft 114.

The second support piece 112 may be connected to the first support piece 111 through the first bending connection portion 115 so as to be bendable without being folded or notched. When assembling the support unit 110, the second support piece 112 is folded toward the first support piece 111 with respect to the first bending connection portion 115 to be in close contact with the sidewall of the first support piece 111.

Both sidewalls of the second support piece 112 may be in close contact with the sidewall of the first support piece 111 and the sidewall of the third support piece 113, respectively. A second through-hole portion 112*a* may be formed at a side edge portion of the second support piece 112. When assembling the support unit 110, in a state in which the second support piece 112 is in close contact with the first support piece 111 and the third support piece 113, the fixing shaft 114 may be inserted and fixed to the second through-hole portion 112*a* of the second support piece 112.

Further, the second support piece 112 may include second shaft grooves 112*d* and 112*e* for respectively supporting at least a portion of the second rotation shaft 152 and at least a portion of a first rotation shaft 151, and a second fixing shaft groove 112*f* for supporting at least a portion of the fixing shaft 114.

The third support piece 113 may be connected to the first support piece 111 through the second bending connection portion 116 so as to be bendable without being folded or notched. When assembling the support unit 110, the third support piece 113 is folded toward the first support piece 111 with respect to the second bending connection portion 116 to be in close contact with the sidewall of the first support piece 111.

Both sidewalls of the third support piece 113 may be in close contact with the sidewall of the second support piece 112 and the sidewall of the first support piece 111, respectively. A third through-hole portion 113*a* may be formed at a side edge portion of the third support piece 113. When assembling the support unit 110, in a state in which the third support piece 113 is in close contact with the first support piece 111 and the second support piece 112, the fixing shaft 114 may be inserted and fixed to the third through-hole portion 113*a* of the third support piece 113.

Further, the third support piece 113 may include third shaft grooves 113*d* and 113*e* for respectively supporting at least a portion of the third rotation shaft 153 and at least a portion of the first rotation shaft 151, and a third fixing shaft groove 113*f* for supporting at least a portion of the fixing shaft 114.

The first support piece 111, the second support piece 112, and the third support piece 113 may be disposed symmetrically to each other with the fixing shaft 114 interposed therebetween.

The fixing shaft 114 may be inserted through the first through-hole portion 111*a*, the second through-hole portion 112*a* and the third through-hole portion 112*a* in a state in which the first support piece 111, the second support piece 112 and the third support piece 113 are in close contact with each other. The fixing shaft 114 fixes the first through-hole portion 111*a*, the second through-hole portion 112*a* and the third through-hole portion 113*a*, so that the first support piece 111, the second support piece 112 and the third support piece 113 can be prevented from being separated from each other. The first through-hole portion 111*a*, the second through-hole portion 112*a* and the third through-hole portion 113*a* may be alternately disposed according to a predetermined order. For example, the first through-hole portion 111*a*, the second through-hole portion 112*a* and the third through-hole portion 113*a* may be alternately arranged according to the order of the first through-hole portion 111*a*, the second through-hole portion 112*a* and the third through-hole portion 113*a*.

The first bending connection portion 115 may connect the first support piece 111 and the second support piece 112 to be bendable without being folded and notched. The first bending connection portion 115 may be formed of a soft material capable of being bent at a predetermined angle. The second bending connection portion 116 may connect the first support piece 111 and the third support piece 113 to be bendable without being folded and notched. The second bending connection portion 116 may be formed of a soft material capable of being bent at a predetermined angle without being folded and notched.

The gate assembly 130 may guide a conveyance direction of a medium moving on the three-way conveyance path 200. To this end, the gate assembly 130 may include a plurality of gates that are rotatably installed on the support unit 110. Since one end of each of the gates is rotated at a point where the conveyance path 200 is branched into the switching paths 120, the other end of each of the gates can selectively open or close each of the switching paths 120.

The gate assembly 130 includes a first gate 131, a second gate 132 and a third gate 133 located on the side of the first conveyance path 201, the second conveyance path 202 and the third conveyance path 203, respectively.

The first gate 131 may guide the conveyance direction of a medium from the first conveyance path 201 to the second conveyance path 202 or the third conveyance path 203. The first gate 131 may include the first rotation shaft 151 rotatably mounted to the support unit 110, and a plurality of first gate pieces spaced apart along the longitudinal direction on one side of the first rotation shaft 151. The first rotation shaft 151 is a rotation axis of the first gate 131 and may be rotatably installed on a lower portion of the support unit 110.

The second gate 132 may guide the conveyance direction of a medium from the second conveyance path 202 to the first conveyance path 201 or the third conveyance path 203. The second gate 132 may include the second rotation shaft 152 rotatably mounted to the support unit 110, and a plurality of second gate pieces spaced apart along the longitudinal direction on one side of the second rotation shaft 152. The second rotation shaft 152 is a rotation axis of the second gate 132 and may be rotatably installed on one side portion of the support unit 110.

The third gate 133 may guide the conveyance direction of a medium from the third conveyance path 203 to the first conveyance path 201 or the second conveyance path 202. The third gate 133 may include the third rotation shaft 153 rotatably mounted to the support unit 110, and a plurality of third gate pieces 163 spaced apart along the longitudinal direction on one side of the third rotation shaft 153. The third rotation shaft 153 is a rotation axis of the third gate 133 and may be rotatably installed on the other side portion of the support unit 110.

The rotation mechanism may include a driving shaft (not shown) of an actuator that is operatively connected to at least one of the first rotating shaft 151, the second rotating shaft 152 and the third rotating shaft 153, and a transmission gear (not shown) for transmitting the driving force of the actuator to the other rotating shafts.

In the present embodiment, the first rotation shaft 151 is operatively connected to the driving shaft of the actuator, and the second rotation shaft 152 and the third rotation shaft 153 receive the driving force of the actuator through the transmission gear (including, e.g., a driving gear, a driven gear and the like). However, the present disclosure is not limited thereto, and the rotation shafts may receive the driving force through various types of rotation mechanisms. Hereinafter, the operation of the medium conveyance route switching device having the above configuration according to one embodiment of the present disclosure will be described.

Figure 5:
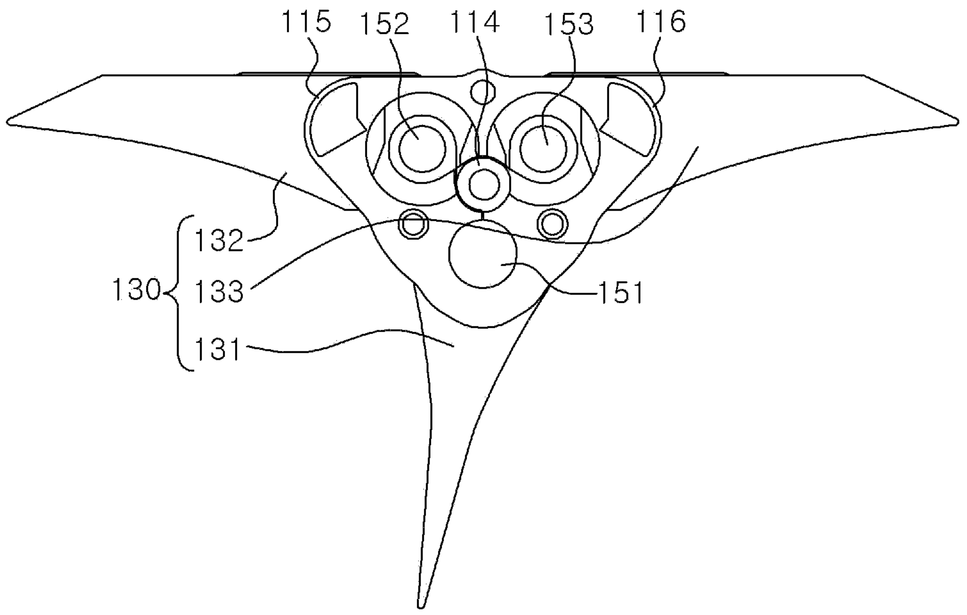
FIG. 5 is a front view showing the medium conveyance route switching device of the automated teller machine according to one embodiment of the present disclosure.
Figure 6:
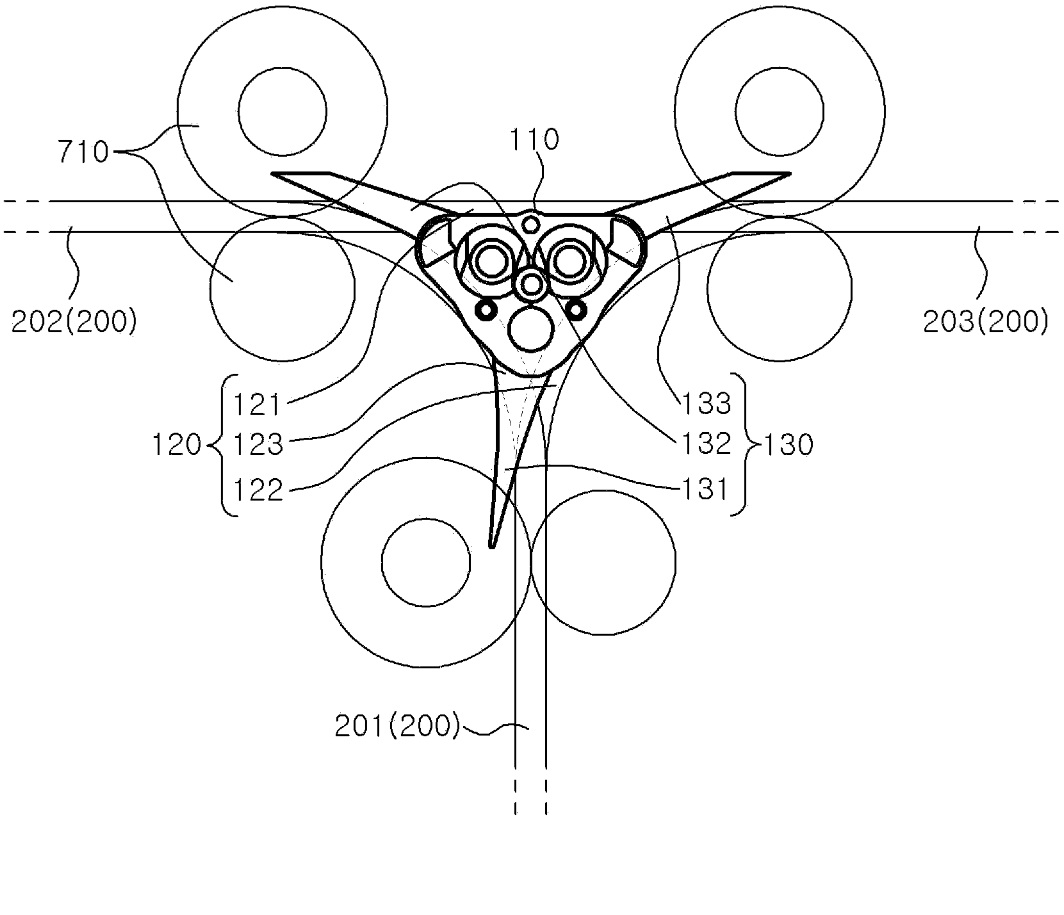
FIGS. 6 to 8 are operation state diagrams showing the operation state of FIG. 5 at the branching point of the conveyance path.
Figure 7:
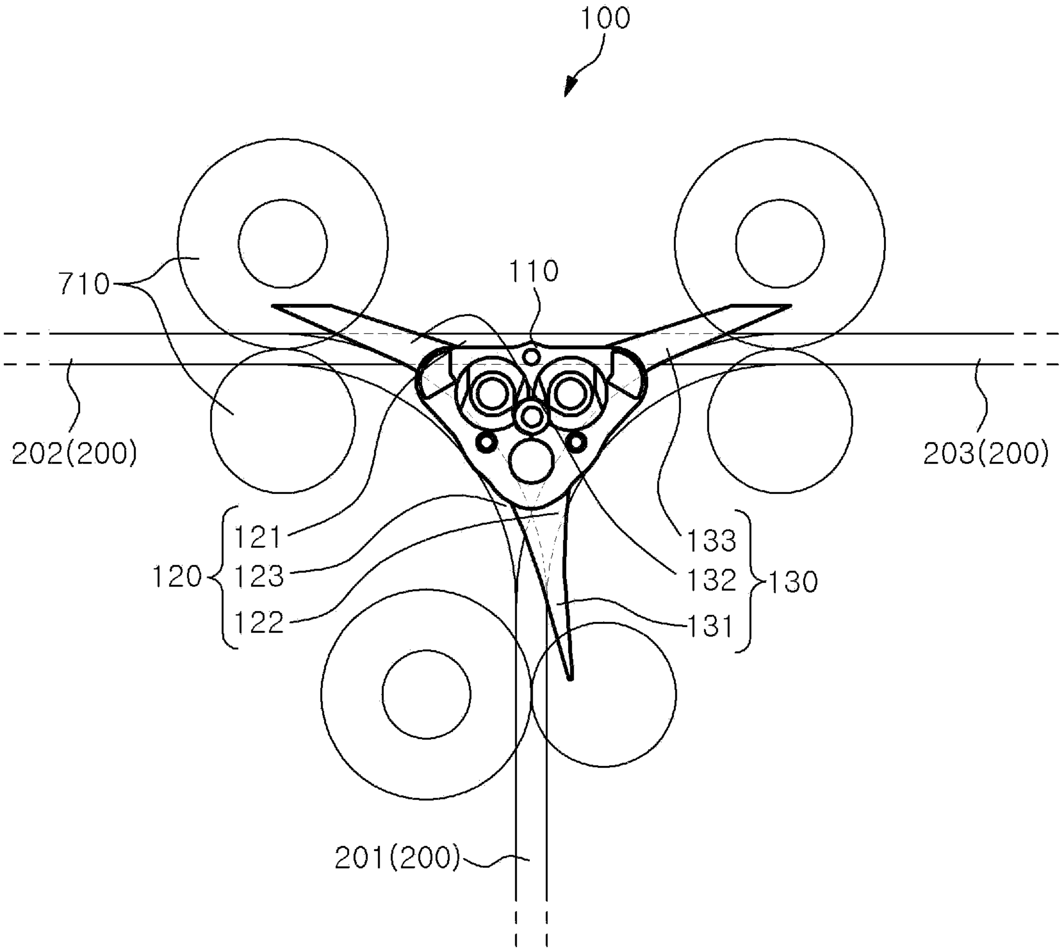
Figure 8:
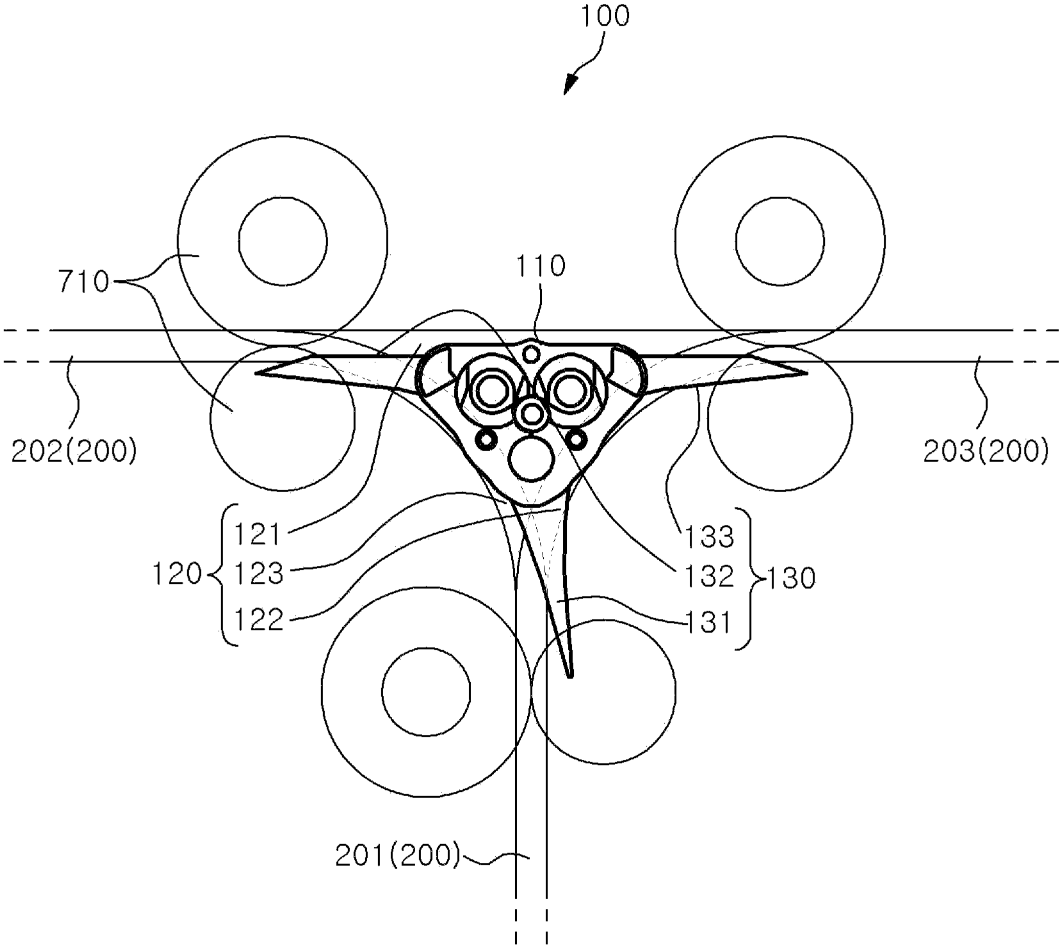

FIGS. 6 to 8 are operation state diagrams showing the operation state of FIG. 5 at the branching point of the conveyance path.

As illustrated in FIGS. 6 to 8, a plurality of branched switching paths 120 may be provided on the conveyance path 200 in order to guide a medium moving along the conveyance path 200 in one direction to the conveyance path 200 in the other direction. For example, the plurality of switching paths 120 may include a first switching path 121, a second switching path 122 and a third switching path 123 that interconnect the three-way conveyance paths 200.

The first switching path 121 may connect the second conveyance path 202 and the third conveyance path 203. The second switching path 122 may connect the first conveyance path 201 and the third conveyance path 203. The third switching path 123 may connect the first conveyance path 201 and the second conveyance path 202. In this case, the first conveyance path 201 may be branched into the second switching path 122 and the third switching path 123. The second conveyance path 202 may be branched into the first switching path 121 and the third switching path 123. The third conveyance path 203 may be branched into the first switching path 121 and the second switching path 122.

For example, as shown in FIG. 6, when by the operation of the actuator, the first rotation shaft 151 of FIG. 5 rotates clockwise in FIG. 6, the second rotation shaft 152 of FIG. 5 rotates clockwise in FIG. 6 and the third rotation shaft 153 of FIG. 5 rotates counterclockwise in FIG. 6, the first gate 131 rotates clockwise in FIG. 6, the second gate 132 rotates clockwise in FIG. 6 and the third gate 133 rotates counterclockwise in FIG. 6, so that the first gate 131 and the third gate 133 may open the second switching path 122.

Accordingly, a medium moving through the first conveyance path 201 may be guided to the third conveyance path 203 through the second switching path 122, or a medium moving through the third conveyance path 203 may be guided to the first conveyance path 201 through the second switching path 122.

As shown in FIG. 7, when, by the operation of the actuator, the first rotation shaft 151 of FIG. 6 rotates counterclockwise in FIG. 7, the first gate 131 rotates counterclockwise in FIG. 7, so that the first gate 131 and the second gate 132 may open the third switching path 123.

Accordingly, a medium moving through the first conveyance path 201 may be guided to the second conveyance path 202 through the third switching path 123, or a medium moving through the second conveyance path 202 may be guided to the first conveyance path 201 through the third switching path 123.

As shown in FIG. 8, when, by the operation of the actuator, the third rotation shaft 153 of FIG. 7 rotates clockwise in FIG. 8 and the second rotation shaft 152 of FIG. 7 rotates counterclockwise in FIG. 8, the third gate 133 rotates clockwise in FIG. 8 and the second gate 132 rotates counterclockwise in FIG. 8, so that the second gate 132 and the third gate 133 may open the first switching path 121.

Accordingly, a medium moving through the second conveyance path 202 may be guided to the third conveyance path 203 through the first switching path 121, or a medium moving through the third conveyance path 203 may be guided to the second conveyance path 202 through the first switching path 121.

As described above, the present disclosure provides a structure capable of accurately and rapidly changing the conveyance direction of a medium at the time of depositing or withdrawing the medium. It is possible to reduce the installation space of the actuator for driving the gate and consequently realize space-intensive arrangement of components in the device. Further, it is possible to increase the branching directions of the conveyance path in conformity with the diversified medium cassette arrangement. In addition, since the three support pieces are connected as one unit, the assemblability of the medium conveyance route switching device can be improved.

While the present disclosure has been shown and described with respect to the preferred embodiments, the scope of the present disclosure does not limited to the particular embodiments described, and those skilled in the art may variously change and substitute components within the scope of the present disclosure, which also belong to the scope of the present disclosure.

What is claimed is:

1. A medium conveyance route switching device for an automated teller machine, comprising:
- a support unit located at a branching point where conveyance directions of a medium converge in three directions; and
- a gate assembly including a plurality of gates to guide at the branching point the medium to different conveyance paths,
- wherein the support unit includes:
  - a first support piece having a first through-hole portion;
  - a second support piece having a second through-hole portion and disposed on one side of the first support piece;
  - a third support piece having a third through-hole portion and disposed on the other side of the first support piece;
  - a first bending connection portion rotatably connecting one end of the first support piece and the second support piece;
  - a second bending connection portion rotatably connecting the other end of the first support piece and the third support piece; and
  - a fixing shaft inserted into the first through-hole portion, the second through-hole portion and the third through-hole portion to prevent the first through-hole portion, the second through-hole portion and the third through-hole portion from being separated from each other in a state in which the first support piece, the second support piece and the third support piece are in contact with each other.

2. The medium conveyance route switching device of claim 1, wherein the support unit is provided in a form of an assembly in which a plurality sets of the first support piece, the second support piece and the third support piece and a plurality sets of a first gate, a second gate and a third gate are alternately provided to be spaced apart and connected along a longitudinal direction of the fixing shaft.

3. The medium conveyance route switching device of claim 2, wherein the first support piece, the second support piece, and the third support piece are disposed symmetrically with the fixing shaft interposed therebetween.

4. The medium conveyance route switching device of claim 1, wherein the plurality of gates include:
- a first gate for guiding the conveyance direction of the medium from a first conveyance path to a second conveyance path or a third conveyance path among the conveyance paths;
- a second gate for guiding the conveyance direction of the medium from the second conveyance path to the first conveyance path or the third conveyance path; and
- a third gate for guiding the conveyance direction of the medium from the third conveyance path to the first conveyance path or the second conveyance path.

5. The medium conveyance route switching device of claim 1, wherein at least one of the first bending connection portion and the second bending connection portion is formed of a flexible material.

* * * * *